United States Patent [19]

Arndt et al.

[11] 4,224,001
[45] Sep. 23, 1980

[54] WINDSHIELD WIPER CONNECTING PIN ADAPTOR

[75] Inventors: John J. Arndt, Chesterton; Gary W. Roadarmel, Michigan City; Francis D. Wirick, Portage, all of Ind.

[73] Assignee: The Anderson Company of Indiana, Gary, Ind.

[21] Appl. No.: 42,049

[22] Filed: May 24, 1979

[51] Int. Cl.² .......................... F16C 11/06; F16D 1/12
[52] U.S. Cl. .................................. 403/163; 403/188; 15/250; 15/32
[58] Field of Search ............... 403/187, 188, 189, 388, 403/406, 161, 163; 15/250.31, 250.32, 250.33

[56] References Cited

U.S. PATENT DOCUMENTS

| 2,916,760 | 12/1959 | Anderson | 403/189 X |
| 2,977,141 | 3/1961 | Ryck | 403/189 |
| 3,179,969 | 4/1965 | Glynn | 15/250.32 |
| 3,254,358 | 6/1966 | Wise | 15/250.32 |
| 3,864,783 | 2/1975 | Arman | 15/250.32 |
| 4,014,061 | 5/1977 | Jurowski et al. | 15/250.32 |
| 4,118,825 | 10/1978 | Hoebrechts et al. | 15/250.32 |

FOREIGN PATENT DOCUMENTS

| 1251670 | 10/1967 | Fed. Rep. of Germany | 15/250.32 |
| 2306218 | 8/1973 | Fed. Rep. of Germany | 15/250.32 |
| 2404474 | 8/1975 | Fed. Rep. of Germany | 15/250.32 |
| 1114388 | 5/1968 | United Kingdom | 15/250.32 |

Primary Examiner—Wayne L. Shedd
Attorney, Agent, or Firm—Wegner, Stellman, McCord, Wood & Dalton

[57] ABSTRACT

In a windshield wiper assembly (10), a connecting adaptor (14) converts a center mounted pin connection between a wiper arm (11) and a pressure-distributing yoke (13) to a side mounted pin connection. In assembled position, the connecting adaptor (14) is disposed over the cross rivet (28) within a center open space (20) defined by the yoke (13). The connecting adaptor (14) has deflectable claw elements (36) with tabs (53) which engage the side walls (16, 17) of the yoke (13) to fixedly maintain the connecting adaptor (14) in proper assembled position. A connecting pin (33) carried by the connecting adaptor (14) and extending laterally outward therefrom provides a side mounted pin connection for pivotally receiving the terminal end (75) of the wiper arm (11).

10 Claims, 5 Drawing Figures

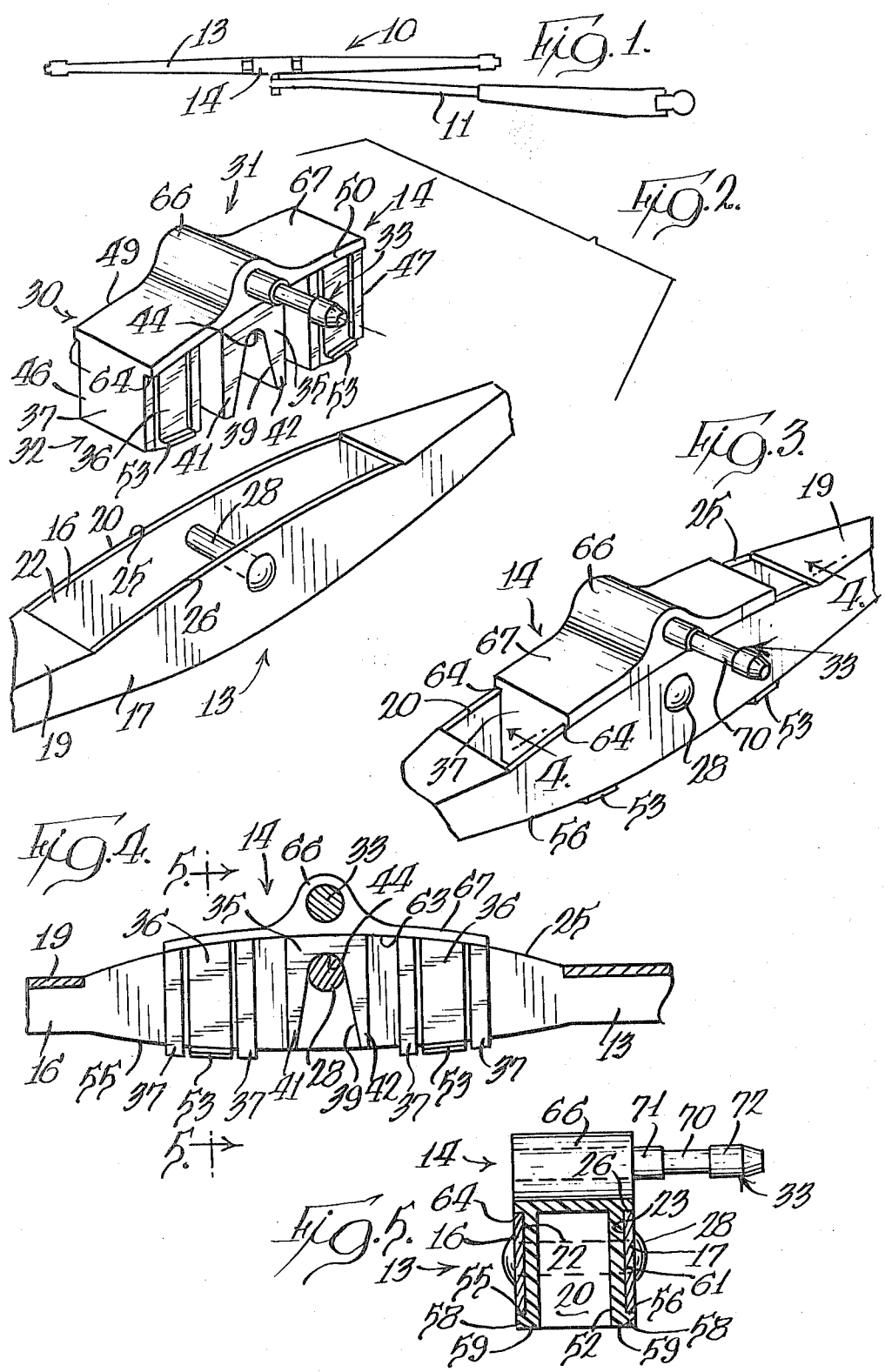

WINDSHIELD WIPER CONNECTING PIN ADAPTOR

DESCRIPTION

TECHNICAL FIELD

This invention relates generally to a windshield wiper assembly and, more particularly, to a connecting adaptor for converting a center mounted pin connection between a wiper arm and a yoke to a side mounted pin connection.

BACKGROUND ART

A windshield wiper assembly for automobiles and the like conventionally includes a wiper blade subassembly, a pressure-distributing superstructure subassembly, and a motor-driven wiper arm. The wiper blade subassembly generally includes a rubber-like wiping element connected to a backing strip or flexor. The pressure-distributing superstructure subassembly, which supports the flexor and hence the wiping element against the windshield surface, includes a primary yoke and optionally one or more secondary yokes. The wiper arm may be connected to the primary yoke by any one of a number of different methods which permit the wiper blade to be mounted pivotally relative to the wiper arm. The wiping element is thereby maintained in operative contact with the windshield as the wiper arm moves the wiper blade to and fro across the windshield that may have a varied contour.

Two connection methods are pertinent to the invention described herein. In the first of these connecting methods, the center mounted pin connection, the primary yoke defines a central opening through which a connecting pin or cross rivet extends transversely. The wiper arm has a terminal end which is positioned within the central opening and defines a hook-like structure adapted for releasable engagement with a U-shaped member carried by the cross rivet to pivotally mount the primary yoke to the wiper arm. In the second of the connection methods, the side mounted pin connection, the primary yoke connecting pin extends laterally outward from the yoke and the the wiper arm is connected to the extending connecting pin with the primary yoke thereby being mounted generally adjacent to the wiper arm.

The wiper blade and pressure-distributing superstructure are substantially the same in both of the aforementioned constructions. Nevertheless, because of the placement of the connecting pins on the respective primary yokes, two different wiper blade assemblies have to be made by the manufacturer and stocked in inventory by the retailer, if original equipment is to be replaced for any reason. The manufacture and inventory of two separate windshield wiper structures is not highly desirable nor highly profitable.

DISCLOSURE OF INVENTION

In one aspect of the invention, a connecting pin adaptor is provided for a windshield wiper assembly to convert a center mounted pin connection to a side mounted pin connection. The connecting adaptor is inserted within the central opening of the yoke over the cross rivet and is maintained in assembled position by deflectable claws which engage the side walls of the yoke. The connecting adaptor carries a connecting pin which extends laterally outward beyond the side of the yoke to enable connection of the wiper arm adjacent the side of the yoke.

In a preferred embodiment of the invention, the connecting adaptor is configured to nestingly seat within the yoke open space and has at each longitudinal end a pair of laterally aligned claws with locking tabs which secure the adaptor to the yoke and prevent rocking motion therebetween. Transverse positioning walls extend across the connecting adaptor adjacent the claws to position the adaptor within the open space and provide protection against disengagement of the claws.

The utilization of a connecting adaptor constructed in accordance with the invention eliminates the necessity of manufacturing and stocking two different types of wiper blade assemblies. Thus, a reduction in cost results without a reduction in the effectiveness of the connection between the wiper arm and the yoke or the function of the windshield wiper assembly as a whole.

BRIEF DESCRIPTION OF DRAWINGS

FIG. 1 is a top plan view of a windshield wiper assembly incorporating a connecting pin adaptor constructed in accordance with the present invention;

FIG. 2 is an enlarged, exploded, perspective view of the center portion of the windshield wiper assembly of FIG. 1 showing an embodiment of the connecting pin adaptor;

FIG. 3 is an enlarged, perspective view of the center portion of the windshield wiper assembly similar to FIG. 2, but showing the adaptor in assembled position within the windshield wiper yoke;

FIG. 4 is a cross-sectional view of the adaptor and yoke taken along line 4—4 of FIG. 3; and FIG. 5 is a cross-sectional view of the adaptor and yoke taken along line 5—5 of FIG. 4.

BEST MODE FOR CARRYING OUT THE INVENTION

Referring to the drawings, and particularly to FIG. 1, a windshield wiper assembly, generally designated 10, to which the present invention generally pertains, is illustrated and is seen to broadly comprise a wiper arm 11 and a pressure-distributing superstructure including a bridge or yoke 13, which carries by conventional means a flexible wiper blade (not shown). The wiper arm 11 and the yoke 13 are interconnected by means of a connecting pin adaptor, generally designated 14, and described in detail hereinafter.

Referring to FIGS. 2 through 5, the yoke 13, which is made of metal, or of some similar substantially rigid material, is channel-shaped in cross section so as to resemble an inverted "U" having laterally disposed side walls 16 and 17 and a base wall 19. The enlarged midportion of the yoke 13 has a vertical open space 20 which is defined by side wall surfaces 22 and 23. Spaced from the arcuate upper edges 25 and 26 of the respective side walls 16 and 17 is a cross rivet 28 extending transversely between the side walls 16 and 17 within the open space 20.

To convert the yoke 13 from a center mounted pin connection to a side mounted pin connection, the connecting adaptor 14 is utilized. When the connecting adaptor 14 is placed on the yoke 13, the connecting adaptor 14 is positioned within the open space 20.

The connecting adaptor 14 is preferably formed from molded plastic material having sufficient inherent resiliency to allow temporary deflection of portions thereof. The connecting adaptor 14 is broadly comprised of a body 30, which includes a top portion 31 and a mounting portion 32 depending downwardly from the top portion 31, and a connecting pin 33 extending laterally outward from the top portion 31.

The mounting portion 32 generally has a transverse width substantially equal to the transverse width of the open space 20 defined between the side wall inner surfaces 22 and 23. The mounting portion 32 broadly includes a center element 35, a plurality of deflectable claw elements 36, and a plurality of transverse positioning walls 37. Defined in the bottom of the center element 35 is a transverse notch or slot 39 which is adapted to receive the cross rivet 28 between the body wall segments 41 and 42 when the connecting adaptor 14 is mounted on the yoke 13. The slot 39 is tapered inwardly so as to facilitate location of the cross rivet 28 therein. The semicylindrical bottom wall 44 of the slot 39 is of a size and a configuration which corresponds with the circular cross section of the cross rivet 28 to permit the cross rivet 28 to rest at the bottom of the slot 39. The interaction of the cross rivet 28 with the slot 39 prevents longitudinal movement of the connecting adaptor 14 within the open space 20.

In an alternative construction (not shown), the slot tapers to a width less than the diameter of the cross rivet 28 and opens into a bore having a configuration and diameter substantially similar to that of the cross rivet 28. In this alternative construction, when the connecting adaptor is assembled to seat the slot 39 over the cross rivet 28, the body wall segments deflect outwardly until the cross rivet 28 resides in the bore. Thereafter, the inherent resiliency of the body effects movement of the body wall segments inwardly to lock the body part on the cross rivet 28.

A pair of laterally aligned claw elements 36 are disposed on each side of the center element 35 near the longitudinal ends 46 and 47 of the connecting adaptor 14. One claw element 36 reposes adjacent each opposed lateral side 49 or 50 of the body 30. Adjacent the lower edge 52 of each claw element 36 is a laterally projecting locking tab 53 which is adapted to engage the bottom edge 55 or 56 of the respective side walls 16 or 17 when the connecting adaptor 14 is mounted in operative position within the open space 20. The locking tabs 53 extend outwardly from the respective claw elements 36 and when the claw elements 36 are in an undeflected condition, the locking tabs 53 of each pair of laterally aligned claws 36 span a distance greater than the transverse width of the open space 20. Inclined cam surfaces 58 are defined on the lower edge 59 of each of the locking tabs 53 so that when the connecting adaptor 14 is inserted downwardly into the open space 20, the side walls 16 and 17 engage the cam surfaces 58 to deflect the structurally thin claw elements 36 inwardly. As the connecting adaptor 14 is moved inwardly further into the open space 20, the outer edges of the locking tabs 53 slide against the respective side wall inner surfaces 22 and 23 until the locking tabs 53 move past the bottom edges 55 and 56 of the side walls 16 and 17. When the locking tabs 53 are no longer biased or flexed inwardly by contact with the side walls 16 and 17, the inherent resiliency of the claw elements 36 will effect movement of the locking tabs 53 laterally outward into position below and in engagement with the bottom wall edges 55 and 56. In this position, the locking tabs 53 prevent upward movement of the connecting adaptor 14 out of the open space 20. When the locking tabs 53 are engaged, the respective outer surfaces 61 of the claw elements 36 lie flush with the inner wall surfaces 22 and 23 as seen in FIG. 5.

Positioned on each side of the center element 35 are a pair of longitudinally aligned transverse positioning walls 37. One positioning wall 37 reposes at each opposed longitudinal end of each respective pair of aligned claw elements 36, which are movable therebetween. The positioning walls 37 each have a transverse width substantially equal to the transverse width of the open space 20 between the side wall inner surfaces 22 and 23. Thus, the positioning walls 37 maintain the connecting adaptor 14 in proper lateral position within the open space 20. Further, the structurally thick positioning walls 37 prevent collapse of the yoke side walls 16 and 17 and collapse of the connecting adaptor itself. The positioning walls 37 have a height substantially equal to the height of the claw elements 36 so as to provide some protection against accidental disengagement of the claw elements 36 from the yoke side walls 16 and 17.

The undersurface 63 of the adaptor top portion 31 is arcuately concave to conform with the arcuate upper edges 25 and 26 of the respective side walls 16 and 17. The transverse width of the top portion 31 is substantially equal to the transverse width of the mid-portion of the yoke 13. In other words, the width of the top portion 31 is slightly greater than the transverse width of the open space 20. Since the width of the mounting portion 32 is substantially equal to the transverse width of the open space 20, an arcuately concave shoulder 64 is defined at each lateral side by the undersurface 63. The arcuate upper edges 25 and 26 of the yoke side walls 16 and 17 abut against the shoulders 64 when the connecting adaptor 14 is located in assembled position within the open space 20. The longitudinally extending shoulders 64 thereby prevent further downward movement of the connecting adaptor 14 when it is inserted into the open space 20 during assembly. Similarly, the bottom wall 44 of the slot 39 will restrict insertion of the connecting adaptor 14 when it engages the cross rivet 28.

The vertical height of the claw elements 36 measured between the locking tabs 53 and the top portion undersurface 63 corresponds to the vertical height of the correspondent portions of the side walls 16 and 17. Thus, when further downward insertion of the connecting adaptor 14 is prevented by engagement between the shoulders 64 and the yoke upper edges 25 and 26, the locking tabs 53 have moved past the yoke bottom edges 55 and 56. In this position, (FIGS. 3 through 5), the locking tabs 53, because of the resiliency of the claw elements 36, have moved laterally outward to a position directly below the respective bottom edges 55 and 56 to effectively lock the connecting adaptor 14 in operative assembled position within the open space 20. The locking tabs 53 holding the connecting adaptor 14 on the yoke 13 and the positioning walls 37 eliminate the possibility of the connecting adaptor 14 rocking back and forth on the midportion of the yoke 13.

When it is desired to remove the connecting adaptor 14 from the yoke 13, the claw elements 36 are manually deflected forcefully inward to disengage the locking tabs 53 from the side walls 16 and 17 and the connecting adaptor 14 is thereafter lifted out of the open space 20.

Referring to FIGS. 3 through 5, it is seen that the connecting pin 33 extends from an enlarged transverse rib 66 defined on the upper surface 67 of the top portion 30. The connecting pin 33 may optionally be made of metal and suitably anchored within the adaptor top portion 30. When the connecting adaptor 14 is locked within the yoke open space 20, the connecting pin 33 passes above the upper edge 26 of the side wall 17. The connecting pin 33 has a circular cross section and includes a constricted segment 70 flanked on each axial side by an enlarged segment 71 or 72. The wiper arm 11 has a terminal end 75 adapted to engage the connecting pin 33. The enlarged segments 71 and 72 of the connecting pin 33 prevent axial disengagement of the wiper arm 11.

INDUSTRIAL APPLICABILITY

From the foregoing, it should be apparent that the connecting adaptor provides a convenient means for converting a wiper blade center mounted pin connection to a side mounted pin connection. As a result, one wiper blade design can be utilized with a wiper arm requiring a center pin connection or with a wiper arm requiring a side pin connection.

Other aspects, objects and advantages of this invention can be obtained from a study of the drawings, the disclosure and the appended claims.

We claim:

1. In a wiper assembly (10) with a yoke (13) having a pair of spaced lateral walls (16,17) defining an opening (20) therebetween and a cross rivet (28) extending between the lateral walls (16,17) within the opening (20) and providing a center mounted pin connection for a wiper arm (11), a connecting pin adaptor (14) for converting to a side mounted pin connection comprising a body (30) having a top portion (31) and a mounting portion (32), and a connecting pin (33) extending laterally outward from said top portion (31) and being adapted for connection to a wiper arm (11), said mounting portion (32) having a slot (39) adapted to receive the cross rivet (28) therein and a plurality of deflectable claws (36) depending from said top portion (31) each having portions (53) adapted to engage the lateral walls (16,17), whereby the mounting portion (32) of the connecting adaptor (14) is inserted into the opening (20) over the cross rivet (28) with the claws (36) being deflected laterally inward until the claw portions (53) deflect outwardly to engage the lateral walls (16,17) to hold the adaptor (14) in position with the connecting pin (33) extending laterally from the yoke (13) above one lateral wall (17) thereof.

2. The wiper assembly (10) of claim 1 wherein said top portion (31) has a lateral width greater than the width of the opening (20) and said mounting portion (32) has a mounting element (35) depending downwardly from said top portion (31) and a lateral width less than the width of the opening (20) with said slot (39) being defined in the bottom thereof.

3. The wiper assembly (10) of claim 2 wherein said claw portions (53) are tabs extending laterally outward with the height of said claws (36) between said tabs and said top portion (31) being substantially equal to the height of the lateral walls (16,17), whereby the tabs engage the bottom (55,56) of the lateral walls (16,17) and the top portion (31) engages the top (25,26) of the lateral walls (16,17) with the adaptor (14) seated in the yoke (13).

4. The wiper assembly (10) of claim 3 wherein said claws (36) are laterally aligned at opposite sides (49,50) of said body (30) with the distance spanned by tabs (53) of laterally aligned claws (36) being greater than the width of the opening (20) and the distance spanned by laterally aligned claw portions free of tabs being substantially equal to the width of the opening (20).

5. The wiper assembly (10) of claim 1 wherein said slot (39) has a bottom wall (44) of a size and configuration corresponding to the cross-sectional configuration of the cross rivet (28), whereby the slot (39) maintains the longitudinal position of the adaptor (14).

6. The wiper assembly (10) of claim 5 wherein said slot (39) is tapered to narrow toward said bottom wall (44).

7. The wiper assembly (10) of claim 1 wherein said claws (36) depend downwardly from said top portion (31) with a pair of said claws (36) being disposed near each longitudinal end (46,47) of said body (30), each pair of claws (36) being laterally aligned at opposite sides (49,50) of said body (30).

8. The wiper assembly (10) of claim 7 wherein said mounting portion (32) includes a plurality of transverse walls (37) depending downwardly from said top portion (31) disposed one adjacent opposite longitudinal ends of each pair of aligned claws (36), said walls (37) having a lateral width substantially equal to the width of the opening (20).

9. The wiper assembly (10) of claim 8 wherein said transverse walls (37) have a height substantially equal to the height of said claws (36).

10. In a wiper assembly (10) with a yoke (13) having a pair of spaced lateral walls (16,17) defining an opening (20) therebetween and a cross rivet (28) extending between the lateral walls (16,17) within the opening (20) and providing a center pin connection for a wiper arm (11), a connecting pin adaptor (14) for converting to a side pin connection comprising a body (30) having a top portion (31) and a mounting portion (32) and a connecting pin (33) extending laterally outward from said top portion (31) and being adapted for connection to a wiper arm (11), said top portion (31) having a lateral width greater than the width of the opening (20), said mounting portion (32) including a mounting element (35) depending from the top portion (31) and having a slot (39) defined in the bottom thereof for receiving the cross rivet (28), a plurality of deflectable claws (36) depending from said top portion (31) each having a locking tab (53) extending laterally outward adapted to engage the bottom (55,56) of the lateral walls (16,17) with a pair of laterally aligned claws (36) being disposed near each longitudinal end (46,47) of said body (30), and a plurality of transverse walls (37) depending from said top portion (31) disposed one at opposite longitudinal ends of each pair of aligned claws (36), whereby the mounting portion (32) of the connecting adaptor (14) is inserted into the opening (20) over the cross rivet (28) with the claws (36) being deflected laterally inward until the claw tabs (53) deflect outwardly to engage the bottom of the lateral walls (16,17) to hold the adaptor (14) in position with the connecting pin (33) extending laterally from the yoke (13) above one lateral wall (17) thereof.

* * * * *